United States Patent [19]

Siebert et al.

[11] Patent Number: 5,209,208

[45] Date of Patent: May 11, 1993

[54] FUEL INJECTION PUMP FOR DIESEL INTERNAL COMBUSTION ENGINES

[75] Inventors: Hans-Joachim Siebert, Schwieberdingen; Hermann Grieshaber, Aichtal-Aich; Bernhard Schenk; Walter Egler, both of Stuttgart; Norbert Meissner, Ditzingen, all of Fed. Rep. of Germany

[73] Assignee: Robert Bosch GmbH, Stuttgart, Fed. Rep. of Germany

[21] Appl. No.: 829,052

[22] PCT Filed: Jul. 7, 1990

[86] PCT No.: PCT/DE90/00508

§ 371 Date: Feb. 10, 1992

§ 102(e) Date: Feb. 10, 1992

[87] PCT Pub. No.: WO91/02151

PCT Pub. Date: Feb. 21, 1991

[30] Foreign Application Priority Data

Aug. 8, 1989 [DE] Fed. Rep. of Germany ....... 3926166

[51] Int. Cl.[5] ............................................. F02M 37/04
[52] U.S. Cl. ..................................... 123/503; 123/299
[58] Field of Search ............... 123/299, 300, 500, 501, 123/503

[56] References Cited

U.S. PATENT DOCUMENTS

| | | | |
|---|---|---|---|
| 3,677,256 | 7/1972 | Regneault et al. | 123/503 |
| 4,367,706 | 1/1983 | Scheying | 123/503 |
| 4,480,623 | 11/1984 | Thomas | 123/503 |
| 4,705,005 | 11/1987 | Güntert et al. | 123/503 |
| 4,721,442 | 1/1988 | Tanaka | 123/503 |
| 4,830,587 | 5/1989 | Güntert et al. | 123/500 |
| 4,881,506 | 11/1989 | Hoecker | 123/503 |
| 4,957,418 | 9/1990 | Pischinger et al. | 123/299 |
| 4,964,789 | 10/1990 | Schueler et al. | 123/503 |
| 4,975,029 | 12/1990 | Hatz | 123/299 |
| 5,097,812 | 3/1992 | Augustin | 123/500 |

FOREIGN PATENT DOCUMENTS

| | | |
|---|---|---|
| 736684 | 7/1943 | Fed. Rep. of Germany . |
| 2389008 | 11/1978 | France . |
| 2620771 | 3/1989 | France . |
| 2629138 | 9/1989 | France . |
| 893621 | 4/1962 | United Kingdom . |

Primary Examiner—E. Rollins Cross
Assistant Examiner—Thomas Moulis
Attorney, Agent, or Firm—Edwin E. Greigg; Ronald E. Greigg

[57] ABSTRACT

A fuel injection pump designed to deliver an amount of fuel divided into a pilot and a main injection volume, including a surface of a pump plunger which is guided within a pump cylinder, apart from two recesses limited by an inclined control edge, a first horizontal control edge is formed by a frontal shoulder; and on a side opposite the shoulder, it has a fully enclosed transverse groove with a second and third control edge. Two control apertures and an annular groove above them in the wall of the pump cylinder effect the control, in conjunction with the aforementioned control edges, of the precisely determinable pilot injection and, after a delivery interval, determined by the difference (b−a) between the width (b) of the transverse groove and the distance of the annular groove to the control aperture, the subsequent main injection. For the purpose of controlling an exact and largely speed-independent start of delivery of both the pilot and the main injection, the control apertures can be equipped with a straight limiting edge on the pump chamber side.

17 Claims, 2 Drawing Sheets

FUEL INJECTION PUMP FOR DIESEL INTERNAL COMBUSTION ENGINES

STATE OF TECHNOLOGY

The invention relates to a fuel injection pump for diesel engines, for the purpose of delivering an amount of fuel, divided into a pilot and a main jet injection quantity, in accordance with features set forth herein.

In the case of modern diesel engines, in particular those with direct injection processes, it is imperative, due to legislative requirements, and because of increased usage of diesel engines due to their favourable fuel consumption and lower fuel costs, that the irritating combustion noises be reduced, whilst their most favourable fuel consumption and exhaust gas values are maintained.

It is well known from the literature and from the results of test rig and road trials, that a noticeable reduction of noise in all load and speed ranges in diesel engines operating with direct injection, can be attained only by injecting an amount of fuel divided into pilot and main jet proportions. In order not to increase the black smoke, which is abhorred in diesel engines, or the hitherto favourable consumption, by pilot injection, the correct pilot injection amount and the correct interval, as determined in trials, between pilot injection and main injection must be precisely adhered to. Although the optimum pilot injection amount and the optimum injection or delivery interval between the pilot and the main injection differ, depending on the load and the speed, a useful compromise can be reached with regard to noise reduction on the one hand and the emission and consumption values on the other hand, by means of a small constant pilot injection volume and a constant delivery interval. An optimum result can be achieved only with two individually controlled fuel injection pumps and the associated injectors or twin injectors for the pilot and the main injection. Such equipment would be too costly and too bulky, and cannot therefore be used with small and medium-sized diesel engines, particularly when these are mounted in vehicles, and in view of this fact, solutions using a single fuel injection pump have been sought for decades.

From German DE-PS 736 684, for example, a fuel injection pump of the construction type in accordance with the generic type is known which has a pump plunger which, for the purpose of delivering the pilot and main injection volumes, and controlling the delivery interval between them, is equipped with a shoulder containing the first control edge, a recess forming the inclined control edge, and a transverse groove controlling the interruption, and which has a pump cylinder which apart from two control holes at different heights, has a separate relief duct which, controlled by the transverse groove, directs the relief fuel into the spring space of the injector during the delivery interval, and there contributes to an increase in pressure. To this end, the transverse groove, which is permanently connected with the pump chamber, controls an additional control aperture in the wall of the pump cylinder. In this arrangement, a disadvantage is that the duration of the delivery interval cannot be made smaller than the duration of the interruption, which results from the sum of the stroke portions determined from the width of the transverse groove and the diameter of the additional control aperture. Since the minimum width of the transverse groove and the diameter of the corresponding control aperture can be determined without noticeable throttling by the intermediate delivery volume which flows through during the maximum full load speed, the desired short period of interruption cannot be realised by the known pump. Moreover, a much too large lift of the injection pump cam, limited by the design, is used; and since there is only one recess, limited by an inclined control edge, the surfaces, which are arranged on opposite sides of the pump plunger with separation, and which are subjected to high pressure during injection, create a very high lateral pressure and a tilting moment at the pump plunger, since only one recess, limited by an inclined control edge, is present. Thus, due to the increased frictional forces, there is a danger of the piston seizing with the consequential damage. It is thus one aim of the invention to provide a fuel injection pump which enables a small, precisely defined pilot injection amount to be delivered, by simple means, with a relatively short injection interval to the main injection. The measures to be taken, particularly at full load operation, must not lead to increased lateral forces at the pump element with the consequential tendency to seize.

ADVANTAGES OF THE INVENTION

The fuel injection pump in accordance with the invention, has, in addition to the desired functional advantages, a number of manufacturing advantages. Thus in the cylinder liner, the two control holes in alignment with each other, and the annular groove offset at a fixed distance from the pump chamber, can be produced to the required accuracy at reasonable cost, because, for example, the width of the annular groove is of lesser importance and the tolerances can be generous, since only the lower edge of the annular groove exercises a control function. This lower edge, with the second control edge of the transverse groove, determines the end of delivery of the pilot injection, and can thus be ground, with sufficient accuracy, with the finely toleranced fixed distance "a" to the control holes, into the wall of the pump cylinder. These advantages are also shown by the second group of features, in accordance with which the difference between the width of the transverse groove and the fixed distance, which determines the duration of the delivery interval, depends in turn on this distance between the second control hole and the lower edge of the annular groove, and whereby the third control edge, which can be produced accurately, on the transverse groove, determines the start of delivery of the main injection with the end of the second control aperture. During the maximum pressure phase, which presents risks with regard to wear, the additional second recess in the casing surface of the pump plunger, also having an inclined control edge, serves shortly before and during the delivery, to balance the side force which would otherwise act on one side of the pump plunger; and the relief duct which, runs via the cut-out and through the annular groove to the transverse groove and from there via the second control aperture to the low pressure chamber, enables precise control of the delivery interval between the pilot injection and the main injection, which has to be strictly adhered to.

By means of the measures listed advantageous further developments and improvements to the fuel injection pump which is the subject of this invention, and which serves to control the pilot and main injections, can be achieved. Thus the control apertures are equipped with a largely straight limiting edge on the pump chamber side, together with the first and third control edges, an extremely accurate, sharply defined start of delivery of both the pilot injection and the main injection can be controlled; because of the lack of a throttle effect due to these features, there is practically no disturbing speed-dependent change. This positive effect can even be achieved with a limiting edge which is only slightly curved, and which otherwise runs perpendicular to the longitudinal axis of the plunger, such an edge permitting a somewhat larger positional deviation of the tools required for the manufacture of the control apertures.

If, in the area acting in conjunction with the inclined control edges of the pump plunger, the control apertures, manufactured as shaped holes, have the radius R, as defined then the delivery of the main injection takes place in the proven manner, as known from the round control holes, since too sharp a discharge at the end of delivery of the main injection would lead to cavitation and erosion at the respective components, due to the extremely high pressures pertaining there. As the control apertures which can be produced or shaped symmetrically, it is possible for both to be produced by a single broaching tool in one operation, which significantly simplifies manufacture. However, if the straight limiting edge is clearly longer than twice the radius R of the control apertures, then due to the longer limiting edge an even faster and more abrupt start of delivery of both the pilot injection and the main injection can be controlled, although the two apertures must be produced separately, by rotation or from both sides simultaneously, for example by spark erosion.

If the distance between the transverse groove and the front face on the pump chamber is smaller than the width of the annular groove, then at the end of delivery of the pilot injection, a shortest possible, direct connection is produced from the pump chamber via the annular groove to the transverse groove and second control aperture, which supports the desired fast end of delivery, and the relatively narrow width of the annular groove has the advantageous effect that at least during the larger part of the main injection, the plunger casing part near the front face is guided within the cylinder bore.

The first group of features with the two control holes in alignment with each other, the annular groove which is offset at a fixed distance "a" relative to the control holes, and the transverse groove in the form of a blind recess on the pump plunger, is actually known from a fuel injection pump (GB-PS 688 003) which also serves the pilot and main injections, but which is otherwise of a different design. There, the delivery interval between the pilot and main injections is determined via the difference between the width of the annular groove and the height of the pump plunger area lying above the transverse groove, for which the front face must be uninterrupted roundness, and the width of the annular groove must be extremely accurately produced, which is exceedingly difficult to achieve, since both limiting edges have a control function. Moreover, in that construction, no extremely small pilot injection amount can be controlled with a precisely defined start of delivery, since the pump chamber must be filled via a suction valve and the pump starts to deliver in the lower dead centre position, which causes a particularly slow increase in pressure, and a too-inaccurate start of delivery of the pilot injection due to the unclear compression ratios.

DRAWING

A design example of the invention, with variants of differently-formed control apertures, is shown in the drawing, and explained in more detail in the description below. The figures show the following:

DESCRIPTION OF THE DESIGN EXAMPLE

Figure 1:
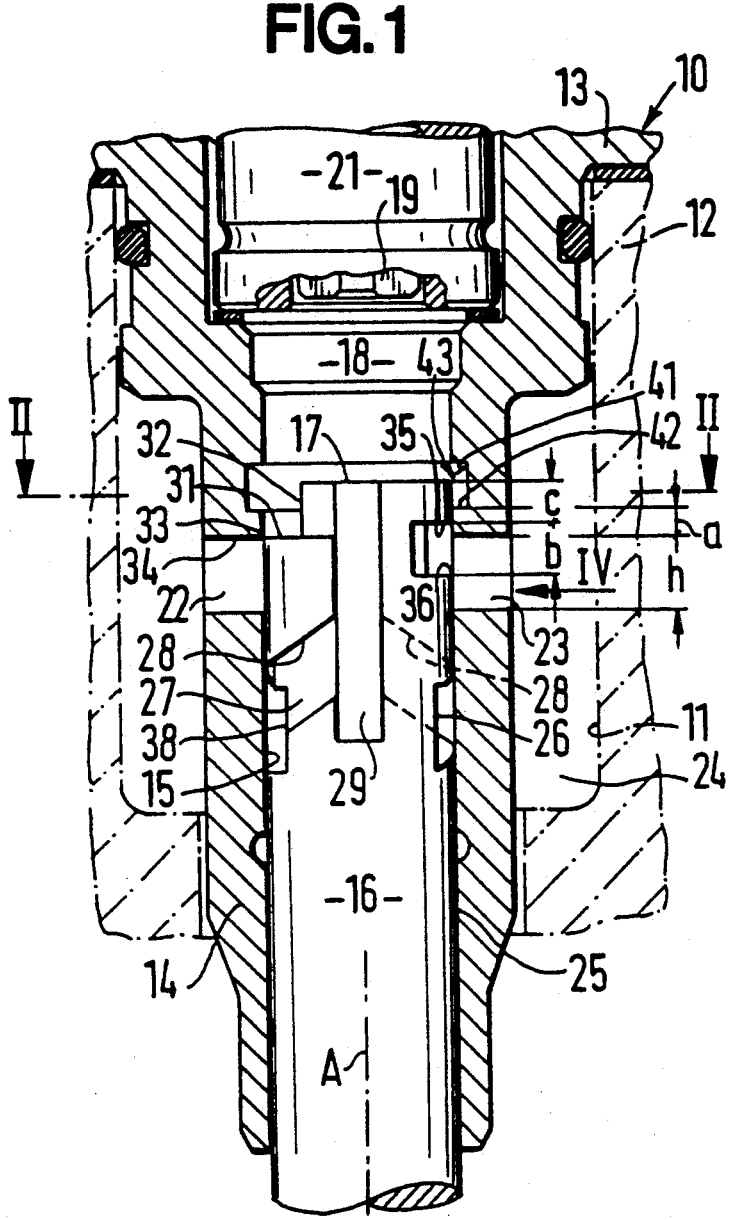
FIG. 1 shows a longitudinal section through that part of the pump element, which is material to this invention, of a fuel injection pump designed for pilot and main injection, with the pump plunger in the start-of-delivery position for the pilot injection.

The pump element 10, which in the drawing is represented only to the extent that it is relevant to the invention, is placed in a stepped location hole 11 of a pump housing 12, indicated only by a dot-dash line, and fixed in the example shown by a flange 13 in a conventional manner. The flange 13 is formed on a pump cylinder 14 designed as a flange element bush; in its cylinder bore 15, a pump plunger 16 is guided axially and rotationally moveable. The pump chamber 18 which, as part of the cylinder bore 15, is on the one hand limited by a front face 17, is on the other hand closed by a pressure valve housing 21 containing a pressure valve 19, both of which are of a well-known construction and are therefore only partially represented. The pump chamber 18 is connected via two control apertures 22 and 23 lying diametrically opposite one another, serving simultaneously as suction and return flow apertures, with a low pressure cavity 24 serving simultaneously as suction and return flow cavity. Into this low pressure cavity 24, the fuel, which is put under inlet pressure by a pilot feed pump, is delivered via a fuel supply pipe not shown in greater detail here.

In the surface, 25, of the pump plunger 16, two recesses 26 and 27 are provided, offset at 180° to one another and formed as angled grooves; their limit, in the direction of the pump chamber 18, in each case forms an inclined control edge 28 with the surface 25 of the pump plunger 16. These recesses 26 and 27 are each permanently connected with the pump chamber 18 via a stopper groove 29 formed in the pump plunger 16 as a longitudinal groove. In place of the stopper groove 29, a longitudinal and transverse hole within the pump plunger 16, and terminating in the recesses 26 and 27, can of course alternatively connect the pump chamber 18 with the recesses; and in place of the inclined control edge 28, formed by an inclined groove, control edges which are helically milled or ground into the casing surface can alternatively be used to control the amount of injection.

For the purpose of controlling an amount of fuel which is divided into pilot and main injection amounts, the surface 25 of the pump plunger 16 is again interrupted, apart from the recesses 26 and 27 and the stopper grooves 29 in an area which acts in conjunction with the first control aperture 22, by a cut-out 32 starting from the front face 17 of the pump plunger 16 and forming a set-back shoulder 31 opposite the front face. The shoulder 31, together with the surface 25, forms a first horizontal control edge 33, running perpendicular to the plunger longitudinal axis marked A, which acts in conjunction with the first control aperture 22, and which, in the sketched start of delivery position of the pump plunger for the pilot injection, closes a limiting edge 34 of the first control aperture 22 on the pump chamber side. Lying roughly diametrically opposite the cut-out 32, a second horizontal control edge 35 is located in that area of the casing surface 25 on the pump chamber side controlled by the second control aperture 23; and located opposite this control edge 35 is a transverse groove 37 forming a third control edge 36. Viewed in the direction of the piston longitudinal axis A, this transverse groove 37 lies between the front face 17 and the first recess 26, and is formed as a blind recess closed by the piston; the shape and peripheral extension of this blind recess can be clearly seen from FIG. 2 and also from the developed view of the surface 25 of the pump plunger in FIG. 3. It can be manufactured in the shape shown by milling and grinding, and alternatively can of course be produced by plunge milling and plunge-cut grinding, as well as by hobbing. In the end area of the second recess 27 facing away from the pump chamber 18 there is another recess, formed by a second transverse groove 38, which serves to limit the starting excess amount in the known manner, but which is of no significance to this invention.

The pump cylinder 14, which in the design example shown is a so-called flange element, can alternatively be in any other known form of a cylinder liner or part of a cylinder head manufactured entirely of steel. The two control apertures 22 and 23 lying diametrically opposite each other, in order to fulfil the intended function, must be at exactly the same height and in alignment with each other, since the various control edges on the pump plunger 16, e.g. in the control of the start of delivery of the pilot injection and of the main injection, act in succession, in conjunction with the first control aperture 22 and then with the second control aperture 23, so that only positional deviations of a few hundredths of a millimetre are possible. Although the control apertures 22 and 23 can have a known circular cross section, shown with dot-dash lines in FIGS. 4, 4a and 4b, and although the known pre-throttle effect can be partially remedied by a cross section which is enlarged in relation to conventional control holes, a constant, exact and almost speed-independent start of delivery is achieved in the design example shown, through the design of the control apertures 22 and 23, as shaped apertures with a non-circular cross section. In the case of the variants of the preferred design example shown in FIGS. 4, 4a and 4b, the limiting edge of these control apertures on the pump chamber side is formed absolutely straight, i.e. horizontal or perpendicular to the plunger longitudinal axis A, as is shown for example by the view in the direction of arrow IV in FIG. 1, in accordance with FIG. 4. In the design example shown in FIG. 4, the length 1 of this limiting edge 34 is approximately twice the radius R, with which the control apertures 22 and 23 on the side opposite the limiting edge 34 are provided. This radius R corresponds to half the diameter of the usual control holes, and must exist at least in that area of the control holes which acts in conjunction with the inclined control edge 28. For this reason, two design variants of the control apertures 22 and 23, shown additionally in FIGS. 4a and 4b, are formed accordingly.

Figure 4:
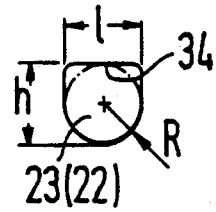
FIGS. 4, 4a and 4b show three shape variants of control apertures, seen in the direction of arrow IV in FIG. 1.
Figure 4A:
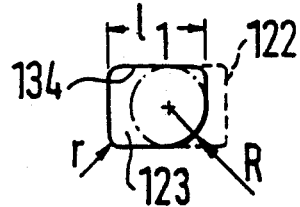

Thus one of the variants, the control aperture 123 in FIG. 4a, is extended to one side, tangentially to the pump cylinder wall, in order to achieve a longer limiting edge 134, starting from the corner, Which has the radius R and acts in conjunction with the inclined control edge 28. For this reason, the control aperture 122 lying opposite, thereto must be manufactured to the same shape by rotating, i.e. offset 180°. This control aperture 122, lying on the reverse face, is shown as a dashed line. The length $l_1$ of the straight limiting edge 134 is larger, preferably by 30 to 50%, than twice the radius R of this control aperture 122 or 123. The other three corners of these control apertures 122 and 123, which do not have the radius R, feature instead a small radius r, which reduces the fatigue stress.

Figure 4B:
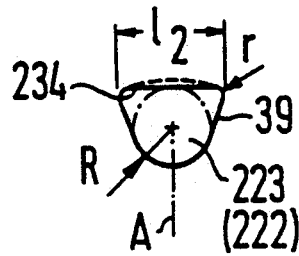

A further design variant of the control apertures, namely the control aperture 223 shown in FIG. 4b, is formed symmetrically in relation to the plunger longitudinal axis A. The limiting edge 234, which with the exception of the two transition radii r is otherwise straight, and the length $l_2$ of which is more than twice the length of the radius R, is connected with the radius R by means of two lateral edges 39 inclined at the same angle to the plunger longitudinal axis A, and thus has a cross section roughly similar to a triangle standing on its apex. Due to the cross section being completely symmetrical with regard to the plunger longitudinal axis A, in this case the first control aperture 222 lying opposite thereto has an identical form, and lies with all its contours fully in alignment with the second control aperture 223 as shown, i.e. directly behind the second control aperture 223. For this reason, in FIG. 4b the relevant reference number of the second control aperture 223 is shown in brackets. The symmetrical form of the control apertures shown in FIGS. 4 and 4b enables their manufacture in one continuous process, e.g. by means of a broach.

The control aperture 22 and 23, or 122 and 123 or 222 and 223, respectively, which is shown in a preferred form in FIG. 4 and in FIGS. 4a and 4b, and which is shaped as a continuous shaped aperture, has in all three design variants a completely straight limiting edge 34, or 134 or 234, which can, however, be curved or domed very slightly, i.e. with a very large radius, without losing the advantages conferred by this invention of a very fast control action at the start of delivery of the pilot and main injection, and thus of the desired independence of load. This shaping is shown, somewhat exaggerated for clearer illustration, by a dashed line in FIG. 4b, and has the advantage that minimal inclinations of the control aperture, as caused by tools, do not have any adverse effects. The height h of the control apertures 22 and 23, measured in the direction of the pump plunger 16 stroke, and shown in FIGS. 1 and 4, corresponds to twice the radius R and the diameter of a control hole usual for the relevant pump sizes. This height is proposed in the present design, in order to maintain the same stroke/bore ratios, as in a standard fuel injection pump working without pilot injection. Deviations from this standard size are, however, readily possible; thus as a substitute for the shaped apertures shown in FIGS. 4, 4a and 4b, a control hole with a larger diameter can be used which, if the other stroke/bore ratios permit, will, due to the greater radius, enable a faster and thus less speed-dependent control of the start of delivery of the pilot and main injections.

Figure 2:
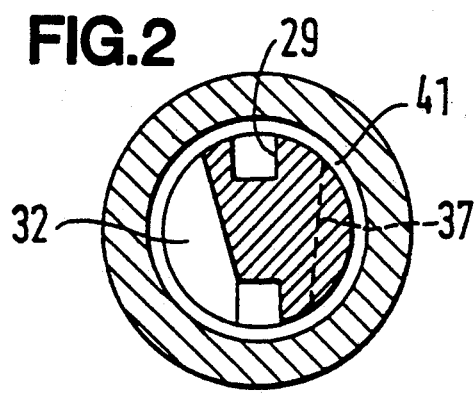
FIG. 2 shows a cross section through II—II in FIG. 1.
Figure 5:
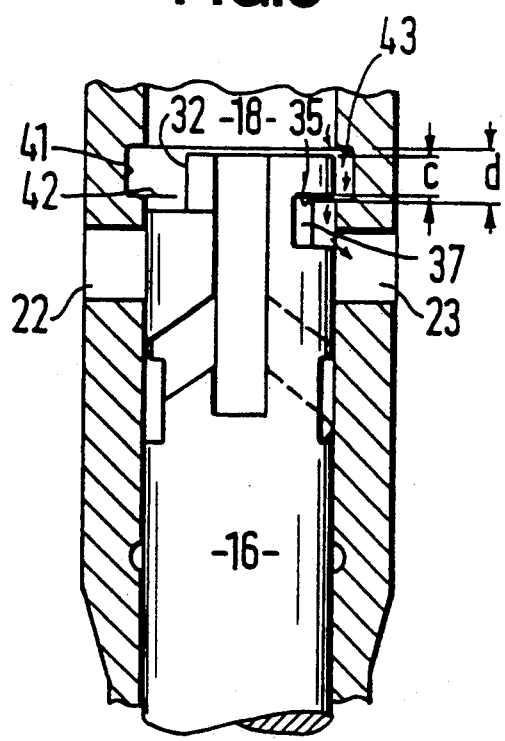
FIGS. 5 and 6 each show one partial longitudinal section in accordance with FIG. 1, but with the pump plunger in the position for the end of delivery of the pilot injection, and for the start of delivery of the main injection respectively.
Figure 6:
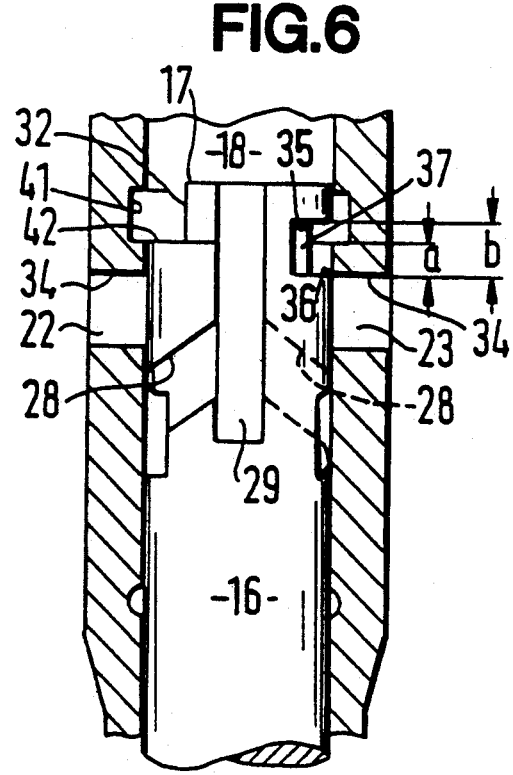

As can be further seen from FIGS. 1 and 2, above the two control apertures 22 and 23, i.e. offset towards the pump chamber 18, a fully enclosed annular groove 41 is formed into the inner wall surface of the cylinder bore 15. This annular groove 41 has, facing the control apertures 22 and 23, a lower edge 42 which acts in conjunction with the second control edge 35 of the transverse groove 37, and is thus a controlling lower edge, and which is produced at a precisely specified distance a from the limiting edge 34, which faces it, of the control apertures 22 and 23. Furthermore, a width b of the transverse groove 37, which determines the distance between the second control edge 35 and the third control edge 36, is greater than the set distance a by a difference $b-a$, which determines the duration—explained in more detail below—of the delivery interval between the pilot and the main injection. The relation can be seen more clearly from the illustration in FIG. 6. The distance between the transverse groove 37 and the front face 17 of the pump plunger on the pump chamber side, described as c in FIGS. 1 and 5, is preferably smaller than the width d of the annular groove 41, so that at the intermediate discharge between the pilot and main injections, a direct i.e. shortest possible connection between the pump chamber 18 to the control aperture 23 via the annular groove 41 and transverse groove 37, is produced. If the difference between the distance c and the width d of the annular groove 41 is smaller than the difference $b-a$ which determines the delivery interval (see FIG. 6), then at the start of delivery of the main injection, as shown in FIG. 6, the plunger front face 17 again dips into the guide of the cylinder bore 15, thereby providing good guidance, and shortly before the piston position shown in FIG. 6, the return flow fuel takes its path from the pump chamber 18 via the cut-out 32 or the stopper grooves 29 into the annular groove 41, and from there via the transverse groove 37 to the control aperture 23. For this reason a relief duct 43, which connects the pump chamber 18 with the low pressure space 24 in order to achieve the delivery interval between the pilot and main injections, can be seen most clearly in the illustration shown in FIG. 5, since there the pump plunger 16 is in the stroke position taken up shortly after the end of delivery of the pilot injection, and the relief duct 43 starting from the pump chamber 18, as indicated by the small arrows, runs from there through the annular groove 41 and the transverse groove 37 to the control aperture 23, the annular groove 41 being in connection with the pump chamber 18 via the cut-out 32 of the pump plunger 16 in every stroke position, even in that shown in FIG. 6. This prevents any detrimental throttling of the return flow fuel before the start of delivery of the main injection.

The pump plunger stroke portion responsible for delivering the pilot injection amount is equal to the overlap, i.e. the distance between the second control edge 35 and the lower edge 42 of the annular groove 41. This overlap results from the difference between the stipulated distance a and the distance between the first control edge 33 and the second control edge 35.

Figure 3:
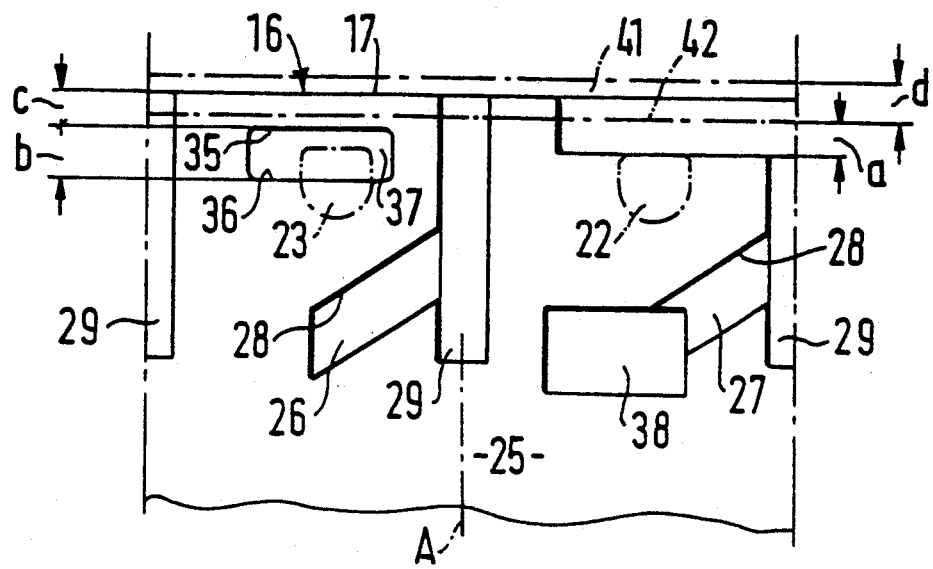
FIG. 3 shows a developed view of the casing surface of the pump plunger of the fuel injection pump represented in FIGS. 1 and 2, with the control aperture and annular groove of the corresponding pump cylinder shown in dot-dash lines.

The developed view shown in FIG. 3 of the surface 25 of the pump plunger 16, shows the spatial position of the control edges, cut-outs and grooves in relation to one another, and here too, the distance and width dimensions, a to d, described above, are shown. Also shown in this illustration, in thick dot-dash lines, are the control apertures 22 and 23, as well as the annular groove 41, for the stroke position shown in FIG. 1 of the pump plunger 16 at the start of delivery of the pilot injection. In the case of a simulated delivery stroke of the pump plunger 16, the control apertures 22 and 23 and the annular groove 41 must be imagined to be displaced downwards in parallel and simultaneously.

The method of operation of the fuel injection pump designed in accordance with the invention is explained below by means of FIGS. 1, 5 and 6.

As already explained, in FIG. 1 the pump plunger 16 is in the position or stroke position which initiates the start of delivery of the pilot injection, after a pilot stroke executed in the usual way up to the closure of the control aperture 22 through the control surface adjoining the first control edge 33. In order to simplify the method of illustration, we shall refer below only to the control function of the edges and apertures, taking for granted the fact that the neighbouring control surfaces become correspondingly effective. In this start of delivery position, the pump chamber 18 is completely closed, and the delivery of the pilot injection amount commences, in a manner not described in further detail, via the pressure line to the injection nozzle after the opening of the pressure valve 19. For preference, a known constant pressure relief valve is employed.

If after a relatively short stroke, corresponding to the pilot injection amount to be delivered, and to the distance between the first control edge 33 and the second control edge 35 of the transverse groove 37, the annular groove 41 is opened, after its lower edge 42 has been wiped over, by the second control edge 35, then the end of delivery of the pilot injection has been reached, and in the stroke position shown in FIG. 5 of the pump plunger 16, intermediate delivery fuel flows out very quickly along the flow path indicated by the arrows through the relief duct 43, formed there by the annular groove 41 and the transverse groove 37, from the pump chamber 18 to the control aperture 23 and from there into the low pressure space 24, controlled by relatively large cross sections. Here, the pressure valve 19 closes, and does not re-open until after the closure of this relief duct 43, when in the stroke position of the pump plunger 16 shown in FIG. 6, the third control edge 36 of the transverse groove 37 closes the second control aperture 23 by wiping over the limiting edge 34. Now the outflow path is again interrupted, and the delivery of the main injection amount begins, up to the discharge which is effected by re-opening of the two control apertures 22 and 23, by means of the two inclined control edges 28. This discharge takes place as in known double-flow pump elements, and is therefore not shown in a separate figure.

The foregoing relates to a preferred exemplary embodiment of the invention, it being understood that other variants and embodiments thereof are possible within the spirit and scope of the invention, the latter being defined by the appended claims.

We claim:

1. A fuel injection pump for diesel internal combustion engines, for the delivery of an amount of fuel divided into a pilot injection amount and a main injection amount, which comprises, at least one pump plunger (16) which is held axially and rotationally movable within a pump cylinder (14) and which limits a pump chamber (18), a jacket face (25) of said at least one pump plunger being interrupted by a first recess (26), said first recess is limited on the pump chamber side by an inclined control edge (28) and is in constant connection with the pump chamber (18) via a flow passage 29, said at least one pump plunger (16) includes a front face (17) which is limited by a cut-out (32) which forms a setback shoulder (31), a first forming horizontal control edge (33) together with said jacket extends perpendicular to the plunger longitudinal axis (A), and a transverse groove (37) in the jacket face, lying diametrically opposite the cut-out on the pump chamber side and forming a second upper horizontal control edge (35) and a third lower control edge (36), between the first recess (26) and the front face (17), with two control apertures (22, 23) lying diametrically opposite each other in the wall of the pump cylinder (14), of which the first of said control apertures (22) is controlled by the first control edge (33), said first of said control apertures is closed to initiate the start of delivery of the pilot injection, and of which at least one of the two control apertures (22, 23) is opened by the first recess (26), controlled by the inclined control edge (28), to end the main injection, and a relief duct (43) connects the pump chamber (18) via the transverse groove with a low pressure space (24) for the purpose of achieving a delivery interval between the pilot injection and the main injection, the two control apertures (22, 23) lie opposite and in alignment with each other and at the same height; the relief duct (43) in the cylinder bore (15) of the pump cylinder (14) comprises an annular groove (41) with a fixed distance (a) to the control apertures (22, 23) and offset towards the pump chamber (18); and the transverse groove (37) on the at least one pump plunger (16) is formed as a blind recess closed on the plunger side, through the second control edge (35) of which the end of delivery of the pilot injection is determined by wiping over a lower edge (42) of the annular groove (41), the width (b) of the transverse groove (37), which determines the distance between the second and third control edges (35 and 36), is larger than the fixed distance (a) between the second control aperture (23) and the lower edge (42) of the annular groove (41) by a difference (b−a) which determines the duration of the delivery interval, control of the start of delivery of the main injection is by means of the third control edge (36), on the delivery stroke, with the closure of the second control aperture (23), a second recess (27), also with an inclined control edge (28), is located in the jacket face (25) of the pump plunger (16), offset by 180° to the first recess (26), and the relief duct (43) is formed with the pump chamber (18) and extends from the cut-out (32) through the annular groove (41) to the transverse groove (37), and from there via the second control aperture (23) to the low pressure space (24) at a respective position of the pump piston.

2. A fuel injection pump in accordance with claim 1, in which the two control apertures (22, 23, 122, 123; 222, 223) have a non-circular cross section limiting edge (34, 134, 234) with a largely straight portion, and a slightly curved portion on the pump chamber side, which, however, overall runs somewhat perpendicular to the plunger longitudinal axis (A).

3. A fuel injection pump in accordance with claim 2, in which the two control apertures (22, 23; 122, 123; 222, 223) provided with the straight portion limiting edge (34; 134; 234) have, at least in the area acting in conjunction with the inclined control edges (28) of the pump plunger (16), a radius (R) relating to the diameter of a conventional control hole.

4. A fuel injection pump in accordance with claim 3, in which the length (l) of the straight portion limiting edge (34) is equivalent to approximately twice the radius (R) of the control aperture (34).

5. A fuel injection pump in accordance with claim 3, in which the length ($l_1$; $l_2$) of the straight portion limiting edge (134); 234) is larger than twice the radius (R) of the control apertures.

6. A fuel injection pump in accordance with claim 3, in which both control apertures (222, 223) are formed symmetrically in relation to the plunger longitudinal axis (A); and that the straight portion limiting edge (234) on the pump chamber side, the centrally located radius (R) on the drive side, and two inclined lateral edges (39) which connect the radius (R) with the straight portion limiting edge (234), the control apertures have a cross section approximating to a triangle standing on its apex.

7. A fuel injection pump in accordance with claim 2 in which the distance (c) between the transverse groove (37) and the front face (17) on the pump chamber side is smaller than the width (d) of the annular groove (41).

8. A fuel injection pump in accordance with claim 2, in which the width (d) of the annular groove (41) is smaller than the height (h) of the control apertures (22, 23) measured in the stroke direction of the pump plunger (16).

9. A fuel injection pump in accordance with claim 3, in which the distance (c) between the transverse groove (37) and the front face (17) on the pump chamber side is smaller than the width (d) of the annular groove (41).

10. A fuel injection pump in accordance with claim 4, in which the distance (c) between the transverse groove (37) and the front face (17) on the pump chamber side is smaller than the width (d) of the annular groove (41).

11. A fuel injection pump in accordance with claim 5, in which the distance (c) between the transverse groove (37) and the front face (17) on the pump chamber side is smaller than the width (d) of the annular groove (41).

12. A fuel injection pump in accordance with claim 6, in which the distance (c) between the transverse groove (37) and the front face (17) on the pump chamber side is smaller than the width (d) of the annular groove (41).

13. A fuel injection pump in accordance with claim 3, in which the width (d) of the annular groove (41) is smaller than the height (h) of the control apertures (22, 23) measured in the stroke direction of the pump plunger (16).

14. A fuel injection pump in accordance with claim 4, in which the width (d) of the annular groove (41) is smaller than the height (h) of the control apertures (22, 23) measured in the stroke direction of the pump plunger (16).

15. A fuel injecting pump in accordance with claim 5, in which the width (d) of the annular groove (41) is smaller than the height (h) of the control apertures (22, 23) measured in the stroke direction of the pump plunger (16).

16. A fuel injection pump in accordance with claim 6, in which the width (d) of the annular groove (41) is smaller than the height (h) of the control apertures (22, 23) measured in the stroke direction of the pump plunger (16).

17. A fuel injection pump in accordance with claim 7, in which the width (d) of the annular groove (41) is smaller than the height (h) of the control apertures (22, 23) measured inthe stroke direction of the pump plunger (16).

* * * * *